US012737058B1

(12) United States Patent
Nakase et al.

(10) Patent No.: US 12,737,058 B1
(45) Date of Patent: Sep. 15, 2026

(54) MULTI-DIRECTION INPUT DEVICE, CONTROLLER HAVING THE DEVICE, AND CONTROL APPARATUS HAVING THE CONTROLLER

(71) Applicant: SHENZHEN ZESUM TECHNOLOGY CO., LTD, Shenzhen (CN)

(72) Inventors: Yusho Nakase, Shenzhen (CN); Wei Yang, Shenzhen (CN); Shi-Ying Yang, Shenzhen (CN); Chao-Xian Chen, Shenzhen (CN)

(73) Assignee: SHENZHEN ZESUM TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 19/372,568

(22) Filed: Oct. 29, 2025

(30) Foreign Application Priority Data

Apr. 16, 2025 (CN) ......................... 202510474171.6

(51) Int. Cl.

| | |
|---|---|
| ***G06F 3/0354*** | (2013.01) |
| ***G06F 3/02*** | (2006.01) |
| ***G06F 3/0338*** | (2013.01) |
| ***H01H 13/14*** | (2006.01) |
| ***H01H 13/705*** | (2006.01) |

(52) U.S. Cl.
CPC .......... *G06F 3/0354* (2013.01); *G06F 3/0202* (2013.01); *G06F 3/0338* (2013.01); *H01H 13/14* (2013.01); *H01H 13/705* (2013.01)

(58) Field of Classification Search
None
See application file for complete search history.

(56) References Cited

FOREIGN PATENT DOCUMENTS

| | | | |
|---|---|---|---|
| CN | 115531859 | A | 12/2022 |
| TW | M645536 | U | 9/2023 |

*Primary Examiner* — Aneeta Yodichkas
(74) *Attorney, Agent, or Firm* — ScienBiziP, P.C.

(57) ABSTRACT

A multi-direction input device includes a housing with a cavity and a first opening; an operation member swingably disposed in the cavity and configured to be pressed; a circuit board; a magnetic sensing assembly; and a press switch. The operation member has an operation body with a first end protruding from the first opening and a protruding portion. A magnetic element on the protruding portion and a magnetic sensor on the circuit board sense magnetic changes as the operation member swings to indicate position of the operation body. The press switch on the circuit board is triggered by pressing the operation body to provide Z-axis input, while X-and Y-axis inputs are sensed magnetically to decouple axes. Options include a support member, a second opening, a pressing member, a limiter, and a return assembly. A controller and a control apparatus including the device are disclosed.

20 Claims, 6 Drawing Sheets

MULTI-DIRECTION INPUT DEVICE, CONTROLLER HAVING THE DEVICE, AND CONTROL APPARATUS HAVING THE CONTROLLER

CROSS-REFERENCE TO RELATED APPLICATION(S)

The present application claims the benefit and priority to Chinese Patent Application Serial No. 202510474171.6, filed on Apr. 16, 2025, in China State Intellectual Property Administration, and the content of which is hereby fully incorporated by reference into the present application.

FIELD

The subject matter relates to input devices, particularly to a multi-direction input device, a controller having the input device, and a control apparatus having the controller.

BACKGROUND

A multi-direction input device (e.g., joysticks) is used to realize operations along X-, Y-, and Z-axes. Position and/or orientation changes are typically sensed by detecting changes of a magnetic field generated by a magnetic element linked to the joystick.

However, in such arrangements a Z axis press often causes a concurrent change in the magnetic field that is also used to sense X-and Y-axis tilt. This introduces magnetic cross axis coupling and electromagnetic interference, which reduce sensing accuracy for the X-and Y-axes during a Z-axis press.

BRIEF DESCRIPTION OF THE DRAWINGS

Implementations of the present technology will now be described, by way of example only, with reference to the attached figures, wherein.

DETAILED DESCRIPTION

Figure 1:
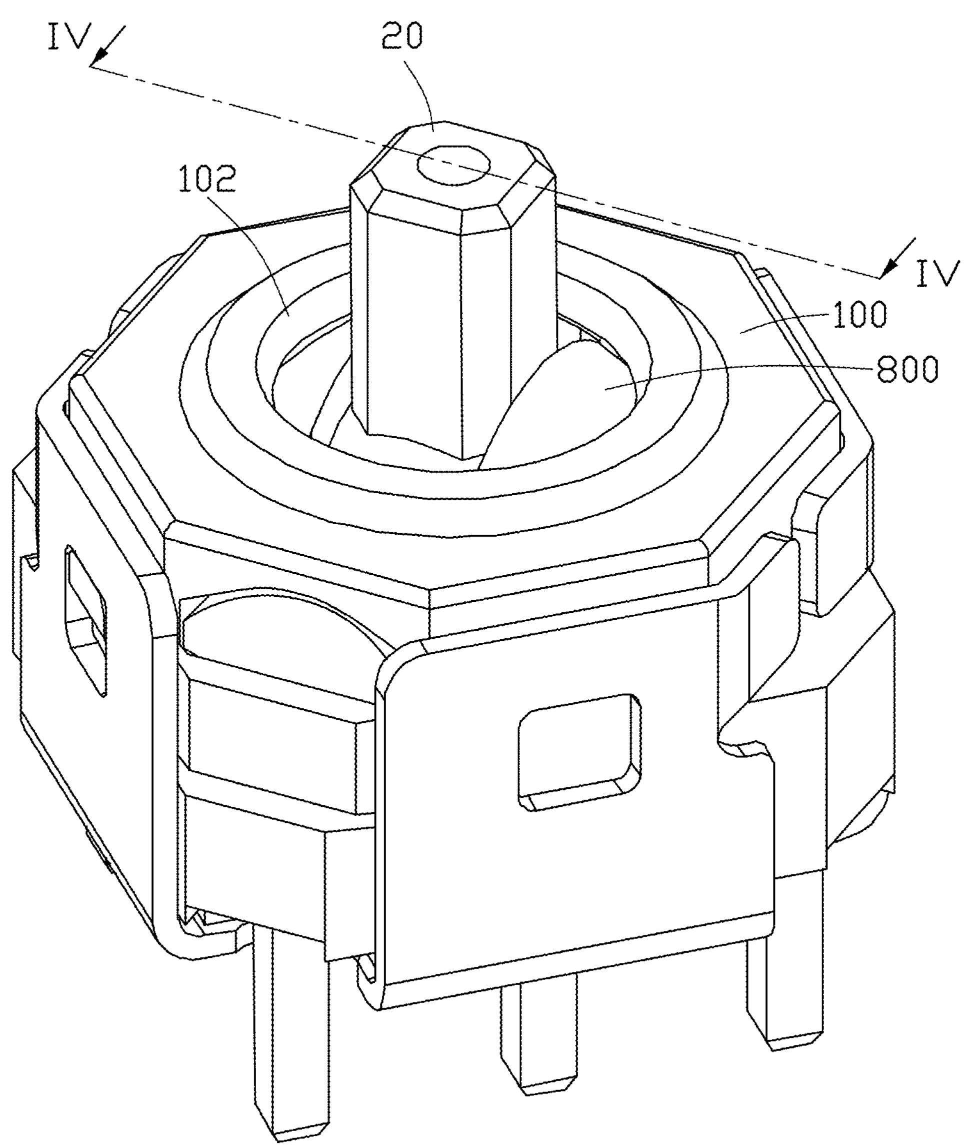
FIG. 1 is a schematic view of a multi-direction input device according to an embodiment.

It will be appreciated that for simplicity and clarity of illustration, where appropriate, reference numerals have been repeated among the different FIG.s to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

For clarity, terms such as "first," "second," etc. are used for distinction and do not limit the scope. Unless otherwise stated, a first direction X, a second direction Y, and a third direction Z may be mutually perpendicular. The drawings are schematic and not necessarily to scale Referring to FIGS. 1, 2, and 3, a multi-direction input device 10 is provided according to an embodiment of the present application. The device 10 includes a housing 100, an operation member 20, a resetting assembly 300, a circuit board 900, a magnetic sensing assembly 400, and a pressing switch 500. The housing 100 defines a cavity 101 and a first opening 102 communicating with the cavity 101. At least a portion of the operation member 20 is swingably disposed in the cavity 101. The operation member 20 is also configured to be pressed along an axis of the operation member 20. The operation member 20 includes an operation body 200 and a protruding portion 210 arranged around a periphery of the operation body 200. The operation body 200 includes a first end 201 that protrudes from the first opening 102. The protruding portion 210 swings with the operation body 200 within the cavity 101.

The circuit board 900 is disposed in the cavity 101. The magnetic sensing assembly 400 includes a magnetic element 401 (e.g., a permanent magnet) and a magnetic sensor 402 (e.g., a Hall effect, AMR, GMR, or TMR sensor). The magnetic element 401 is fixed to the protruding portion 210. The magnetic sensor 402 is disposed in the cavity 101 on a side of the circuit board 900 away from the protruding portion 210 and is electrically connected to the circuit board 900. As the operation member 20 swings in the cavity 101, the magnetic element 401 tilts relative to the magnetic sensor 402, and the magnetic sensor 402 senses changes in at least one of a magnitude and a direction of a magnetic flux density (B-field) generated by the magnetic element 401, the changes corresponding to the position and/or tilt of the operation body 200. The pressing switch 500 is disposed in the cavity 101 on a side facing the protruding portion 210 and is electrically connected to the circuit board 900. The pressing switch 500 is configured to be triggered when the operation body 200 is pressed. Optionally, the housing 100 is formed of or lined with an electromagnetic shielding material (e.g., a metal shell or insert) to reduce external interference.

In the device 10, a Z-axis press is sensed by the pressing switch 500, while X-and Y-axis tilts are sensed by the magnetic sensing assembly 400. By physically separating Z-axis detection from magnetic sensing, the arrangement reduces magnetic cross axis coupling and improves the independence of the X-and Y-axis sensing channels, thereby enhancing control precision. The resetting assembly 300 returns the operation body 200 to an initial position after swinging, improving reset precision and stability when the device 10 is not operated. Integrating the pressing switch 500 within the device 10 enriches input modes, enabling complex operations by pressing and swinging, and simplifies structure by omitting separate press terminals, which also benefits reset accuracy.

Figure 2:
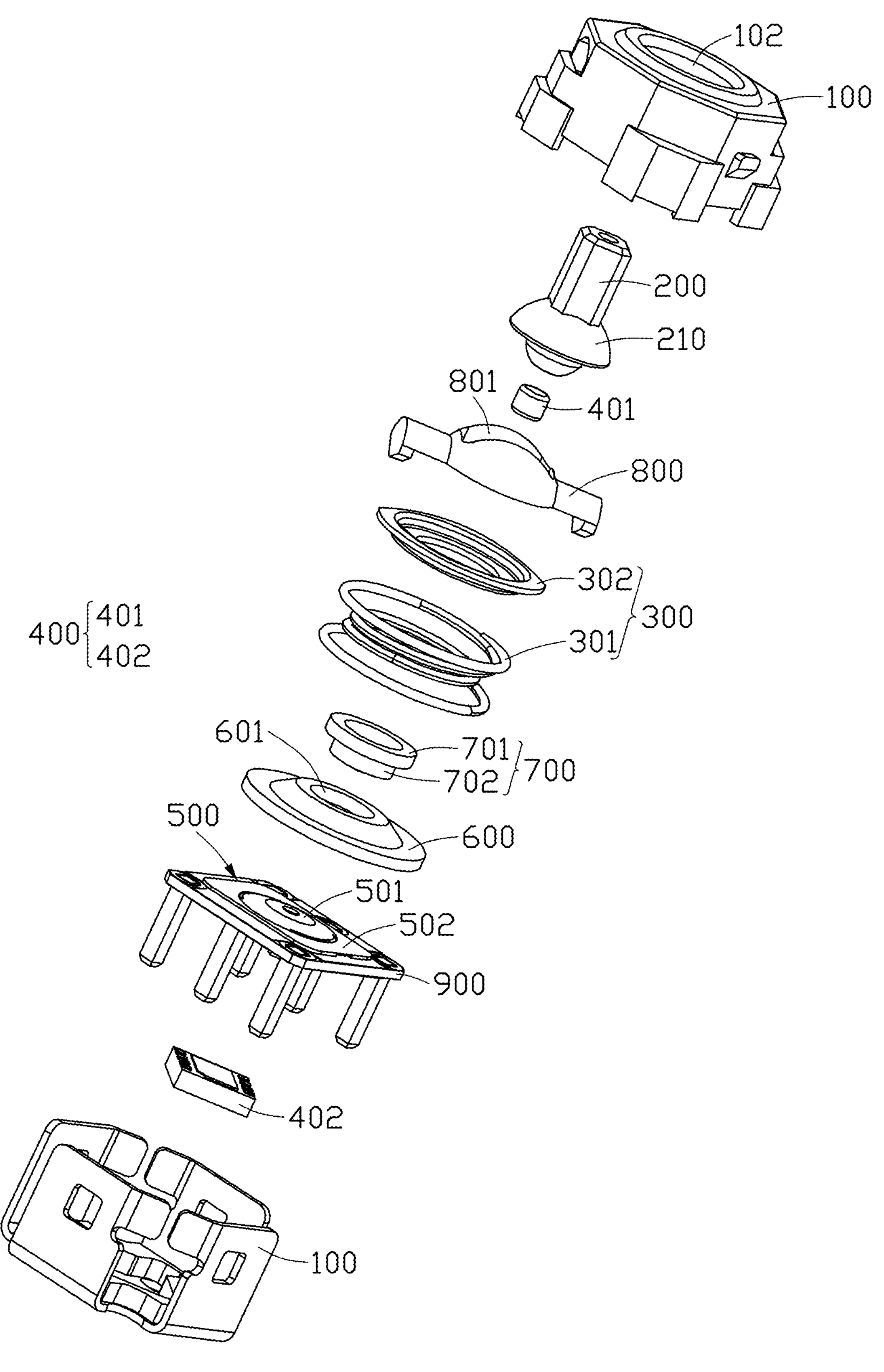
FIG. 2 is an exploded view of the input device of FIG. 1.
Figure 3:
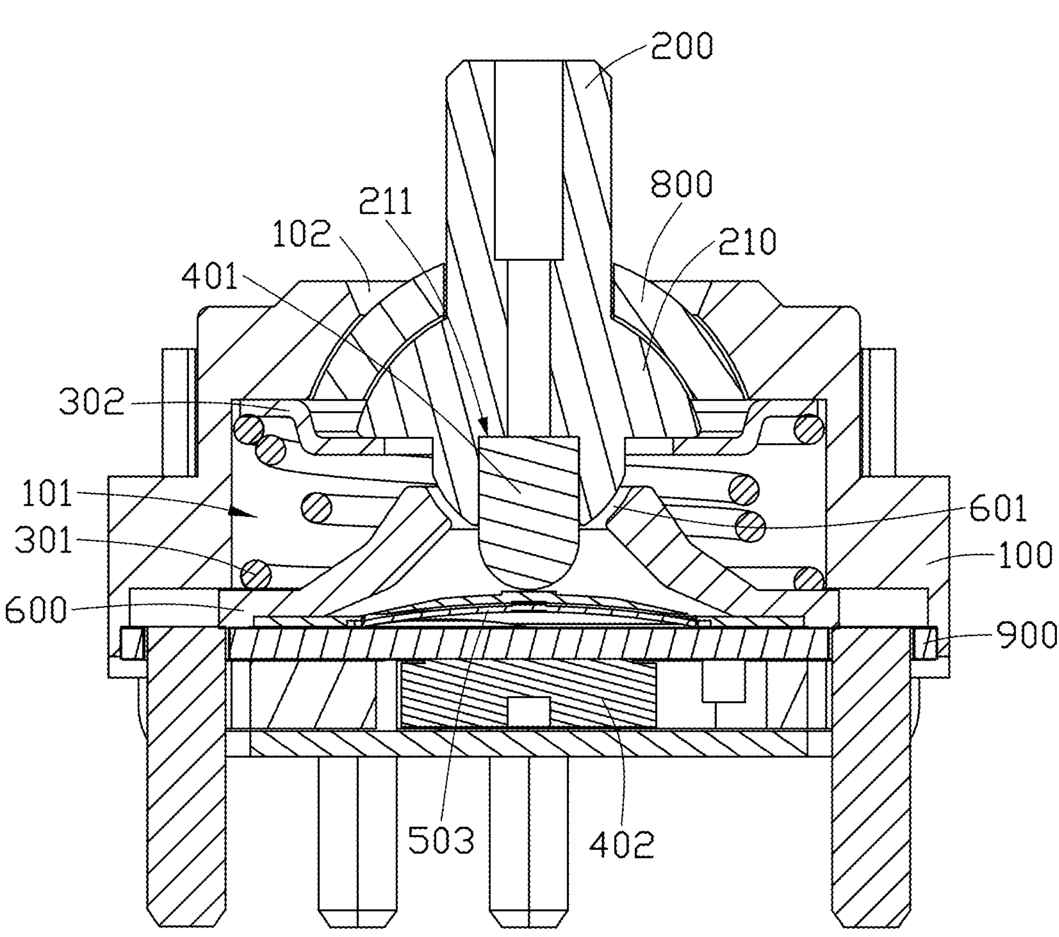
FIG. 3 is a cross-sectional view of FIG. 1 taken along line III-III according to one embodiment.

Referring to FIGS. 2 and 3, in one embodiment the pressing switch 500 includes an elastic deforming portion 501, a fixing portion 502, and a contact 503. The fixing portion 502 is arranged at a periphery of the elastic deforming portion 501 and is fixed to the circuit board 900 or a support mounted thereto. The contact 503 is located on the circuit board 900 on a side of the elastic deforming portion 501 facing the circuit board 900 and is electrically connected to the circuit board 900. The operation body 200 is configured to press the elastic deforming portion 501 to trigger the contact 503. Integrating the fixing portion 502, the elastic deforming portion 501, and the contact 503 simplifies the switch structure, improves mounting convenience and stability, and facilitates assembly of the device 10 into a control apparatus 40. The elastic deforming portion 501 provides sensitive actuation and durability under frequent pressing.

Referring to FIG. 3, the device 10 further includes a supporting member 600 disposed in the cavity 101 on a side of the pressing switch 500 toward the protruding portion 210. The pressing switch 500 can be mechanically fixed to the supporting member 600 while being electrically connected to the circuit board 900. The supporting member 600 defines a second opening 601 facing the protruding portion 210. A pressing portion associated with the protruding portion 210 (e.g., an extension or plunger) is configured to pass through the second opening 601 to trigger the pressing switch 500. The supporting member 600 stabilizes the pressing switch 500, improves internal layout of the cavity 101, and maintains correct relative positioning during operation of the protruding portion 210, thereby improving triggering reliability and consistency and reducing false triggers or missed triggers. The second opening 601 permits a lower end of the protruding portion 210 or the pressing portion to extend through the supporting member 600 to actuate the pressing switch 500, providing intuitive operation.

Figure 4:
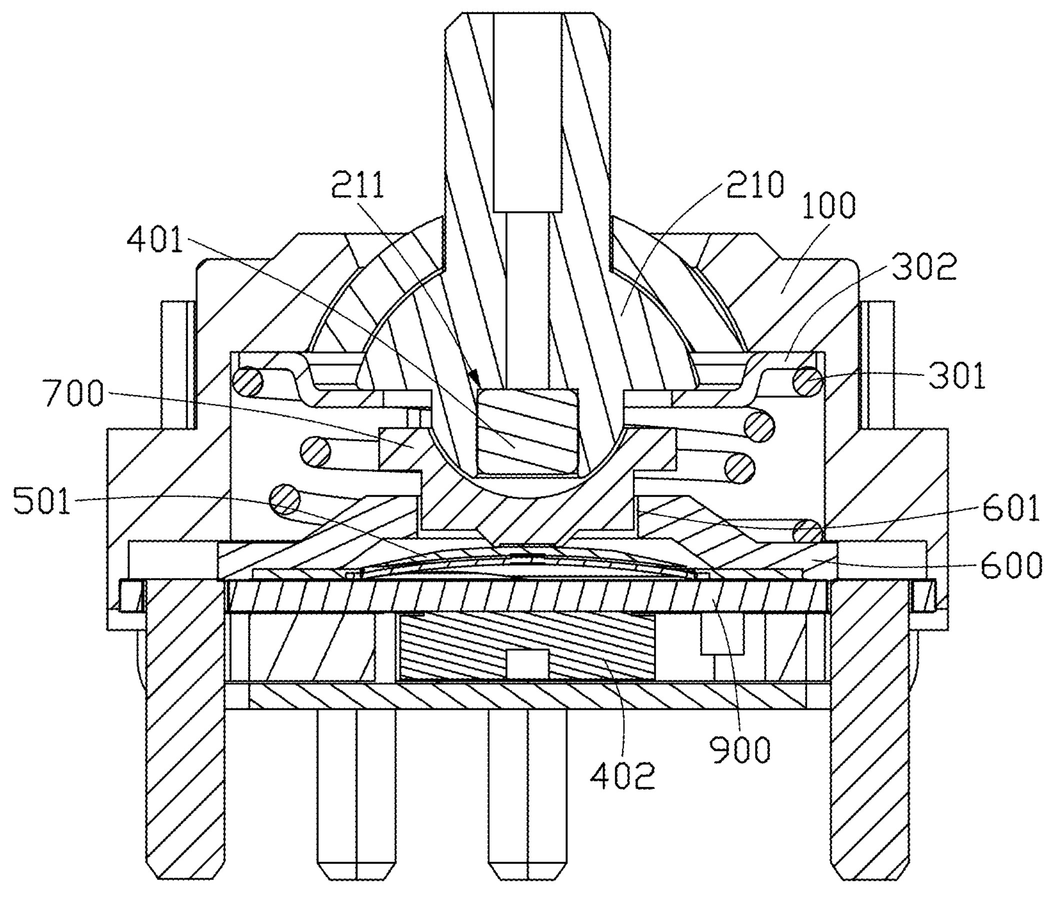
FIG. 4 is a cross-sectional view of FIG. 1 taken along line IV-IV according to another embodiment.

Referring to FIG. 4, in another embodiment the device 10 further includes a pressing member 700 disposed at an end of the supporting member 600 toward the protruding portion 210. The pressing member 700 includes an abutting portion 701 abutting the protruding portion 210 and a pressing portion 702 fixed to the abutting portion 701 and configured to pass through the second opening 601. Direct abutment between the abutting portion 701 and the lower end of the protruding portion 210 improves triggering efficiency and response speed. Precise positioning of the pressing member 700 improves input accuracy during rapid operation.

Referring to FIG. 4, a diameter of the abutting portion 701 is greater than a diameter of the second opening 601. The abutting portion 701 bridges across the second opening 601 on the supporting member 600. This prevents jamming during operation and ensures that the elastic deforming portion 501 rebounds after pressing. The abutting portion 701 quickly returns to an initial position after actuation, improving efficiency during repeated operations and stabilizing positional reset and tactile feedback. By limiting movement of the pressing member 700, wear is reduced and service life is extended.

Referring to FIG. 2, the device 10 further includes a limiting member 800 disposed in the cavity 101. The limiting member 800 defines a guide slot 801 through which the operation body 200 passes. The operation body 200 is configured to slide along the guide slot 801 while swinging. The guide slot 801 constrains motion within a predetermined range to prevent over tilt, thereby improving input accuracy, protecting internal components, and reducing operational risk.

Referring to FIGS. 2 and 3, the resetting assembly 300 is disposed in the cavity 101 and elastically abuts the protruding portion 210. The resetting assembly 300 is configured to provide restoring potential energy when the operation member 20 swings in the cavity 101, thereby returning the operation member 20 to an original position. The resetting assembly 300 includes an elastic member 301 (for example, a coil spring, a leaf spring, a torsion spring, and/or an elastomeric element) and a pressing plate 302. The elastic member 301 is disposed in the cavity 101. The pressing plate 302 is arranged at an end of the elastic member 301 near the first opening 102. The elastic member 301 urges the pressing plate 302 against the protruding portion 210. When a pressing force is applied to the operation body 200, the pressing plate 302 is depressed and the elastic member 301 provides resistance and elastic feedback, which clarifies actuation feel and reduces wear between the pressing member 700 and the protruding portion 210.

Referring to FIG. 4, an end of the protruding portion 210 toward the circuit board 900 defines a groove 211. At least a portion of the magnetic element 401 is fixed in the groove 211. The magnetic element 401 cooperates with the groove 211 while the pressing portion 702, not the magnetic element 401, passes through the second opening 601 to trigger the pressing switch 500 when the protruding portion 210 is pressed. The groove 211 positions the magnetic element 401 to improve sensing consistency and responsiveness.

Figure 5:
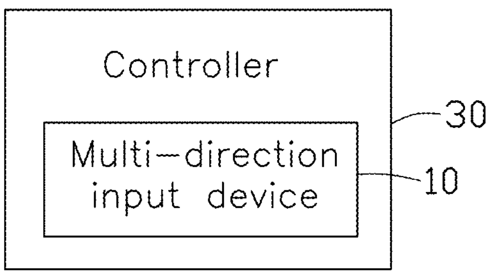
FIG. 5 is a block diagram of a controller according to an embodiment.

Referring to FIG. 5, a controller 30 includes the multi-direction input device 10. The Z-axis press is sensed by the pressing switch 500, whereas X-and Y-axis operations are sensed by the magnetic sensing assembly 400, which reduces magnetic cross axis coupling and improves precision. The arrangement of the magnetic sensing assembly 400 and the pressing switch 500 reduces electromagnetic interference and improves stability across environments. The compact arrangement of the multi-direction input device 10 can also reduce the size of the controller 30.

Figure 6:
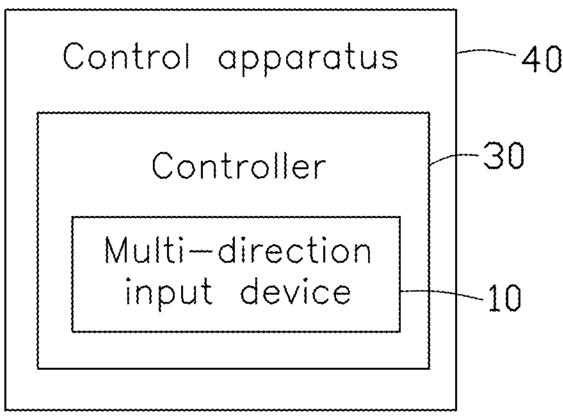
FIG. 6 is a block diagram of a control apparatus according to an embodiment.

Referring to FIG. 6, a control apparatus 40 includes the controller 30. The control apparatus 40 may include, without limitation, consumer and professional products that benefit from compact multi direction input, such as game controllers, VR/AR controllers, smart TV remotes, handheld terminals, drones or robotic manipulators, vehicle infotainment units, medical or industrial control panels, and similar devices.

The embodiments described above are examples. Many details are well known in the art and are omitted for conciseness. Even though numerous characteristics and advantages of the present technology have been set forth above, the description is illustrative only, and changes may be made in detail, including the shape, size, and arrangement of parts, within the scope of the present disclosure and the appended claims. Accordingly, the embodiments may be modified within the scope of the claims.

What is claimed is:

1. A multi-direction input device, comprising:

a housing defining a cavity and a first opening communicating with the cavity;

an operation member disposed at least partially in the cavity and swingable relative to the housing, the operation member comprising an operation body and a protruding portion extending from a periphery of the operation body, the operation body having a first end protruding from the first opening;

a circuit board disposed in the cavity;

a magnetic sensing assembly comprising a magnetic element fixed to the protruding portion and a magnetic sensor disposed on the circuit board on a side away from the protruding portion; and a pressing switch disposed in the cavity on a side facing the protruding portion and electrically connected to the circuit board;

wherein the operation member is configured to be pressed along a central axis of the operation member, pressing being applied via the operation body; the pressing switch is configured to be triggered in response to pressing of the operation body;

and the magnetic sensor is electrically connected to the circuit board and is configured to sense changes in at least one of (i) a magnitude of a magnetic flux density and (ii) a direction of the magnetic flux density generated by the magnetic element as the operation member swings in the cavity, the changes corresponding to a position of the operation body.

2. The device of claim 1, wherein the pressing switch comprises an elastic deforming portion, a fixing portion at a periphery of the elastic deforming portion, and a contact, the fixing portion is fixed to the circuit board or to a support mounted to the circuit board, the contact is located on a side of the circuit board facing the elastic deforming portion, and pressing of the operation body depresses the elastic deforming portion to move the contact, thereby triggering the pressing switch.

3. The device of claim 1, further comprising a supporting member, wherein the supporting member is disposed in the cavity on a side of the pressing switch toward the protruding portion, the pressing switch is fixed to the supporting member, the supporting member defines a second opening toward the protruding portion, and a pressing portion operatively coupled to the protruding portion is configured to extend through the second opening to trigger the pressing switch, the pressing portion being either an integral extension of the protruding portion or a portion of a separate pressing member that engages the protruding portion.

4. The device of claim 3, further comprising a pressing member, wherein the pressing member is disposed at an end of the supporting member toward the protruding portion, the pressing member comprises an abutting portion abutting the protruding portion and a pressing portion fixed to the abutting portion and configured to extend through the second opening.

5. The device of claim 4, wherein a diameter of the abutting portion is greater than a diameter of the second opening.

6. The device of claim 1, further comprising a limiting member, wherein the limiting member is disposed in the cavity, the limiting member defines a guide slot through which the operation body passes, and the operation body is configured to slide along the guide slot as the operation body swings in the cavity.

7. The device of claim 1, further comprising a resetting assembly, wherein the resetting assembly is disposed in the cavity and elastically abuts the protruding portion, the resetting assembly is configured to return the operation member to an original position when the operation member swings in the cavity, the resetting assembly comprises an elastic member disposed in the cavity and a pressing plate at an end of the elastic member near the first opening, and the elastic member pushes the pressing plate against the protruding portion.

8. The device of claim 1, wherein the protruding portion defines a groove toward the circuit board, and at least a portion of the magnetic element is fixed in the groove.

9. A controller, comprising a multi-direction input device, wherein the multi-direction input device comprises:

a housing defining a cavity and a first opening communicating with the cavity;

an operation member disposed at least partially in the cavity and swingable relative to the housing, the operation member comprising an operation body and a protruding portion extending from a periphery of the operation body, the operation body having a first end protruding from the first opening;

a circuit board disposed in the cavity;

a magnetic sensing assembly comprising a magnetic element fixed to the protruding portion and a magnetic sensor disposed on the circuit board on a side away from the protruding portion; and a pressing switch disposed in the cavity on a side facing the protruding portion and electrically connected to the circuit board;

wherein the operation member is configured to be pressed along a central axis of the operation member, pressing being applied via the operation body; the magnetic sensor is electrically connected to the circuit board and configured to sense changes in at least one of (i) a magnitude of a magnetic flux density and (ii) a direction of the magnetic flux density generated by the magnetic element as the operation member swings in the cavity, the changes corresponding to a position of the operation body;

and the pressing switch is configured to be triggered when the operation body is pressed.

10. The controller of claim 9, wherein the pressing switch comprises an elastic deforming portion, a fixing portion at a periphery of the elastic deforming portion and fixed to the circuit board or to a support mounted thereto, and a contact on the circuit board on a side facing the elastic deforming portion, the operation body being configured to press the elastic deforming portion to move the contact, thereby triggering the pressing switch.

11. The controller of claim 9, wherein the multi-direction input device further comprises a supporting member disposed in the cavity on a side of the pressing switch toward the protruding portion, the pressing switch is fixed to the supporting member, the supporting member defines a second opening toward the protruding portion, and a pressing portion operatively coupled to the protruding portion is configured to extend through the second opening to trigger the pressing switch, the pressing portion being either an integral extension of the protruding portion or a portion of a separate pressing member that engages the protruding portion.

12. The controller of claim 11, wherein the multi-direction input device further comprises a pressing member, the pressing member is disposed at an end of the supporting member toward the protruding portion, the pressing member comprising an abutting portion abutting the protruding portion and a pressing portion fixed to the abutting portion and configured to extend through the second opening.

13. The controller of claim 12, wherein a diameter of the abutting portion is greater than a diameter of the second opening.

14. The controller of claim 9, wherein the multi-direction input device further comprises a limiting member disposed in the cavity, the limiting member defines a guide slot through which the operation body passes, and the operation body is configured to slide along the guide slot while swinging.

15. The controller of claim 9, wherein the multi-direction input device further comprises a resetting assembly disposed in the cavity and elastically abutting the protruding portion, the resetting assembly being configured to return the operation member to an original position when the operation member swings in the cavity, the resetting assembly comprising an elastic member disposed in the cavity and a pressing plate at an end of the elastic member near the first opening, the elastic member urging the pressing plate against the protruding portion.

16. The controller of claim 9, wherein the protruding portion defines a groove toward the circuit board and at least a portion of the magnetic element is fixed in the groove.

17. A control apparatus, comprising a controller, wherein the controller comprises a multi-direction input device, the multi-direction input device comprises:

a housing defining a cavity and a first opening communicating with the cavity;

an operation member disposed at least partially in the cavity and swingable relative to the housing, the operation member comprising an operation body and a protruding portion extending from a periphery of the operation body, the operation body having a first end protruding from the first opening;

a circuit board disposed in the cavity;

a magnetic sensing assembly comprising a magnetic element fixed to the protruding portion and a magnetic sensor disposed on the circuit board on a side away from the protruding portion; and a pressing switch disposed in the cavity on a side facing the protruding portion and electrically connected to the circuit board;

wherein the operation member is configured to be pressed along a central axis of the operation member, pressing being applied via the operation body; the magnetic sensor is electrically connected to the circuit board and configured to sense changes in at least one of (i) a magnitude of a magnetic flux density and (ii) a direction of the magnetic flux density generated by the magnetic element as the operation member swings in the cavity, the changes corresponding to a position of the operation body;

and the pressing switch is configured to be triggered when the operation body is pressed.

18. The control apparatus of claim 17, wherein the pressing switch comprises an elastic deforming portion, a fixing portion at a periphery of the elastic deforming portion and fixed to the circuit board or to a support mounted thereto, and a contact on the circuit board on a side facing the elastic deforming portion, the operation body being configured to press the elastic deforming portion to move the contact, thereby triggering the pressing switch.

19. The control apparatus of claim 17, wherein the multi-direction input device further comprises a supporting member disposed in the cavity on a side of the pressing switch toward the protruding portion, the pressing switch is fixed to the supporting member, the supporting member defines a second opening toward the protruding portion, and a pressing portion operatively coupled to the protruding portion is configured to extend through the second opening to trigger the pressing switch, the pressing portion being either an integral extension of the protruding portion or a portion of a separate pressing member that engages the protruding portion.

20. The control apparatus of claim 19, wherein the multi-direction input device further comprises a pressing member, the pressing member is disposed at an end of the supporting member toward the protruding portion, the pressing member comprising an abutting portion abutting the protruding portion and a pressing portion fixed to the abutting portion and configured to extend through the second opening.

* * * * *